(12) United States Patent
Yamane et al.

(10) Patent No.: US 11,008,421 B2
(45) Date of Patent: May 18, 2021

(54) POLYAMIDE FINE PARTICLE, METHOD FOR PRODUCING SAME, AND POLYAMIDE FINE PARTICLE COMPOSITION

(71) Applicant: Kureha Corporation, Tokyo (JP)

(72) Inventors: Kazuyuki Yamane, Chuo-ku (JP); Daisuke Murano, Chuo-ku (JP); Yingge Xiao, Chuo-ku (JP)

(73) Assignee: KUREHA CORPORATION, Tokyo (JP)

( * ) Notice: Subject to any disclaimer, the term of this patent is extended or adjusted under 35 U.S.C. 154(b) by 80 days.

(21) Appl. No.: 16/086,132

(22) PCT Filed: May 2, 2017

(86) PCT No.: PCT/JP2017/017251
§ 371 (c)(1),
(2) Date: Sep. 18, 2018

(87) PCT Pub. No.: WO2017/195705
PCT Pub. Date: Nov. 16, 2017

(65) Prior Publication Data
US 2020/0231751 A1 Jul. 23, 2020

(30) Foreign Application Priority Data
May 10, 2016 (JP) .............................. JP2016-094932

(51) Int. Cl.
*C08G 69/26* (2006.01)
*C08G 69/24* (2006.01)
*C08G 69/18* (2006.01)
*C08J 3/14* (2006.01)

(52) U.S. Cl.
CPC ............. *C08G 69/24* (2013.01); *C08G 69/18* (2013.01); *C08J 3/14* (2013.01); *C08J 2377/02* (2013.01)

(58) Field of Classification Search
CPC ...... C08L 2205/18; C08L 77/06; C08L 77/02; C08J 2377/06; C08J 3/12; C08G 18/603; C08G 69/26
See application file for complete search history.

(56) References Cited

U.S. PATENT DOCUMENTS

| 5,264,553 | A | 11/1993 | Hou | |
|---|---|---|---|---|
| 2006/0269749 | A1 | 11/2006 | Okumura | |
| 2009/0246235 | A1* | 10/2009 | Asano | A61K 8/025 424/401 |
| 2011/0086948 | A1* | 4/2011 | Hong | C08L 1/02 524/35 |
| 2011/0311821 | A1 | 12/2011 | Kaiso et al. | |
| 2012/0321893 | A1* | 12/2012 | Couzis | C08G 69/02 428/402 |
| 2014/0349113 | A1 | 11/2014 | Saito et al. | |
| 2016/0009869 | A1 | 1/2016 | Biedasek et al. | |

FOREIGN PATENT DOCUMENTS

| CN | 102388088 A | 3/2012 |
|---|---|---|
| CN | 102399371 A | 4/2012 |
| CN | 103467823 A | 12/2013 |
| EP | 2404955 A1 | 1/2012 |
| JP | H05-505643 A | 8/1993 |
| JP | H08-012765 A | 1/1996 |
| JP | 2006-328208 A | 12/2006 |
| JP | 2011-094128 A | 5/2011 |
| JP | 2013072086 A | 4/2013 |
| JP | 2016-509117 A | 3/2016 |
| JP | 2016186068 A | 10/2016 |
| WO | 10/101134 A1 | 9/2010 |

OTHER PUBLICATIONS

Office Action for CN Application No. 201780012515.5 dated Jun. 30, 2020, 17 pgs.
Taniyama, Nagaoka, Takata, Sayama; Alkali-Catalyzed Polymerization of alpha-Pyrrolidone in the Presence of N,N'-Adipyl-dipyrrolidone: The Journal of the Society of Chemical Industry, Japan, vol. 65, No. 3 (1962).
International Search Report for PCT/JP2017/017251 dated Jul. 25, 2017.
Supplementary European Search Report for Application No. EP 17 79 6066 dated Apr. 4, 2019, 8 pgs.
International Preliminary Report on Patentability from PCT/JP2017/017251 dated Nov. 22, 2018, 10 pgs, translation only.
Office Action for JP Application No. 2018-516987 dated Mar. 3, 2020, 6 pgs.
Nam et al., Preparation of Nylon 4 microspheres via heterogeneous polymerization of 2-pyrrolidone in a paraffin oil continuous phase, Journal of Industrial and Engineering Chemistry, 2015, vol. 28, p. 236-240, 5 pgs.
Office Action for JP2018-516987 dated Jul. 30, 2019, 12 pgs.
Additional experimental test based on method of Document (Journal of Industrial and Engineering Chemistry 28 (2015) p. 236-240, 8 pgs.
Office Action for CN Application No. 201780012515.5 dated Jan. 26, 2021, 18 pgs.
Wang, Kai, et al., "Mixing Equipment Design", Mechanical Industry Press, Apr. 2000, 5 pages.

* cited by examiner

*Primary Examiner* — Gregory Listvoyb
(74) *Attorney, Agent, or Firm* — Abel Schillinger, LLP

(57) ABSTRACT

The present invention is to provide a spherical polyamide fine particle having smooth sliding properties and causing a low degree of environmental pollution. The polyamide fine particle according to the present invention includes: a polyamide including a repetition of a structural unit having at least one alkylene group and at least one amide bond, each of the at least one alkylene group having from 1 to 5 carbon atoms, wherein the polyamide fine particle has a sphericity of 80 or greater.

5 Claims, 4 Drawing Sheets

POLYAMIDE FINE PARTICLE, METHOD FOR PRODUCING SAME, AND POLYAMIDE FINE PARTICLE COMPOSITION

TECHNICAL FIELD

The present invention relates to a polyamide fine particle, a method for producing the same, and a polyamide fine particle composition containing the polyamide fine particle.

BACKGROUND ART

In recent years, fine plastic particles have been used for cosmetics, personal care products, industrial products such as coating materials, and the like. Among such fine particles, a spherical fine particle having smooth sliding properties has been used in a variety of fields such as cosmetics. In such fine particles, synthetic resins such as polyethylene resins and polyamide resins, represented by nylon, have been used.

For example, Patent Document 1 describes a resin particle mainly composed of polyamide 1010 resin.

Furthermore, a synthesis method of a particular polyamide is described in, for example, Non-patent Document 1.

CITATION LIST

Patent Literature

Patent Document 1: JP 2013-72086 A (published on Apr. 22, 2013)

Non-Patent Literature

Non-patent Document 1: Masakazu Taniyama, Takeshi Nagaoka, Toshihiro Takata, Kazunori Sayama. "Alkaline Catalyst Polymerization of α-Pyrrolidone in the Presence of N,N'-Adipyl Dipyrrolidone", Journal of Industrial Chemistry, 1962, vol. 65 (3), 419-422

SUMMARY OF INVENTION

Technical Problem

However, major synthetic resins currently used for a fine plastic particle, such as polyamide 1010 resin that is used in the resin particles described in Patent Document 1, does not have biodegradability. Therefore, in recent years, environmental impact of these synthetic fine plastic particles have become a concern. That is, there is a concern that aquatic organisms may intake discarded fine particle, and biomagnification occurs as a result of the food chain, causing an effect on a human body, the like.

The present invention was completed in light of the problems described above, and an object of the present invention is to provide a spherical fine particle having smooth sliding properties and decreasing environmental pollution.

Solution to Problem

As a result of diligent research to solve the problems described above, the inventors of the present invention found that a spherical fine plastic particle having polyamide having a particular structure can be advantageously used as a fine particle causing a decrease in environmental pollution, and thus completed the present invention.

That is, the polyamide fine particle of an embodiment of the present invention includes a polyamide including a repetition of a structural unit having at least one alkylene group and at least one amide bond, each of the at least one alkylene group having from 1 to 5 carbon atoms, wherein the polyamide fine particle has a sphericity of 80 or greater.

Furthermore, a method for producing a polyamide fine particle of an embodiment of the present invention is a method including: dissolving a polyamide in hot water, the polyamide including a repetition of a structural unit having at least one alkylene group and at least one amide bond, each of the at least one alkylene group having from 1 to 5 carbon atoms; and precipitating a polyamide fine particle composed of the polyamide by cooling the hot water.

Advantageous Effects of Invention

The polyamide fine particle of an embodiment of the present invention decomposes in the environment when the polyamide fine particle is disposed, and thus a degree of environmental pollution is low. Furthermore, the sphericity of the polyamide fine particle of an embodiment of the present invention is 80 or greater, the polyamide fine particle has excellent sliding properties as a spherical fine particle.

DESCRIPTION OF EMBODIMENTS

Figure 1:
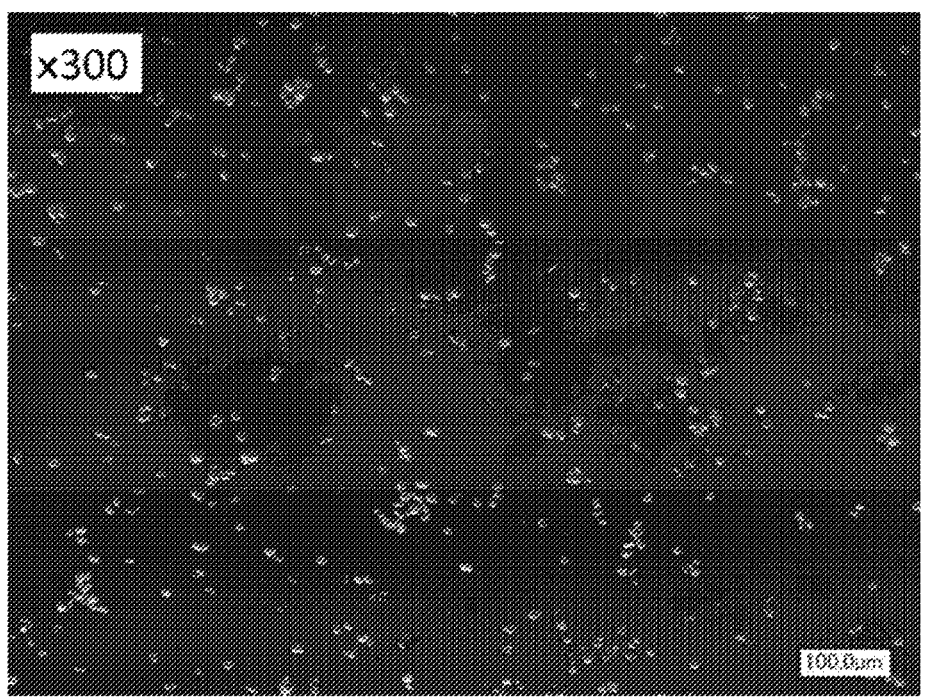
FIG. 1 is an optical photomicrograph of polyamide fine particles obtained by setting the concentration of the polyamide 4 to 0.1 wt. % in Example 1 of an embodiment of the present invention.

Hereinafter, embodiments of the present invention will be described.

Polyamide Fine Particles

The polyamide fine particle according to the present embodiment (hereinafter, also referred to as "polyamide fine particle") includes a polyamide including a repetition of a structural unit having at least one alkylene group and at least one amide bond, each of the alkylene group having from 1 to 5 carbon atoms, wherein the polyamide fine particle has a sphericity of 80 or greater.

Polyamide

In the present specification, "polyamide" is a polymer having a structure represented by —CONH—.

More specifically, the polyamide according to the present embodiment includes a repetition of a structural unit having at least one alkylene group and at least one amide bond, each of the alkylene group having from 1 to 5 carbon atoms.

In the present embodiment, the polyamide having the structure described above has biodegradability. Note that, in the present specification, "biodegradability" indicates polyamide that is decomposed into a low molecular weight compound, such as water and carbon dioxide, by effect of microorganisms, water, or the like. That is, "biodegradability" in the present specification includes hydrolyzability.

The number of the repetition of the structural unit according to the present embodiment may be decided appropriately based on the weight average molecular weight of the polyamide. Note that the weight average molecular weight of the polyamide is described below in detail.

In the present embodiment, the structural unit described above is not particularly limited as long as it includes at least one alkylene group and at least one amide bond. However, the structural unit preferably includes from 1 to 4, more preferably from 1 to 3, and most preferably from 1 to 2 alkylene groups. Furthermore, the structural unit preferably includes from 1 to 4, more preferably from 1 to 3, and even more preferably from 1 to 2 amide bonds.

Furthermore, each of the alkylene group according to the present embodiment is not particularly limited as long as it has the number of carbon atoms from 1 to 5. However, the alkylene group preferably has the number of carbon atoms from 1 to 4, and more preferably from 1 to 3.

The alkylene group according to the present embodiment may be a linear chain or a branched-chain. Furthermore, in a case where the structural unit includes a plurality of alkylene groups, each alkylene group preferably includes the number of carbon atoms from 1 to 4.

Examples of an aspect of the structural unit according to the present embodiment include a structural unit represented by Formula (1) below

Formula(1)

In Formula (1), x is an integer from 2 to 5 and is preferably 2, 3, or 4.

Furthermore, examples of another aspect of the structural unit according to the present embodiment include a structural unit represented by Formula (2) below

[Chemical Formula 2]

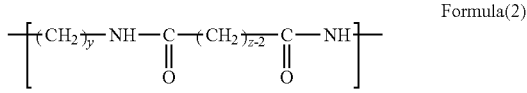

Formula(2)

In Formula (2), y is an integer from 1 to 5, and z is an integer from 3 to 7. Furthermore, y and z are each independently preferably 2, 3, or 4.

In the present specification, "polyamide including a repetition of a structural unit represented by Formula (1)" may be referred to as "polyamide x" depending on the number of x of Formula (1). Therefore, for example, in the case of polyamide wherein x is 4 in Formula (1), this polyamide is referred to as "polyamide 4".

Polyamide Fine Particle

Sphericity

In the present specification, the sphericity is a value calculated based on the following Equation (3) after measuring the minor axis and major axis of n particles of polyamide fine particles that have been randomly chosen.

[Equation 1]

$$\text{Sphericity} = \left\{ \left( \sum_{i=1}^{n} (\text{minor axis/major axis}) \right) / n \right\} \times 100 \quad \text{Formula (3)}$$

Note that, in the present embodiment, n is preferably 30 in Equation (3).

To accurately measure the minor axis and the major axis of the polyamide fine particles in the present embodiment, it is preferable to take an optical photomicrograph or a scanning electron micrograph of the polyamide fine particles and then measure the minor axis and the major axis of the polyamide fine particles by using the micrograph obtained. Furthermore, when an optical photomicrograph is used, the magnification of the optical photomicrograph is preferably 300 times or greater.

As the value of the sphericity in Equation (3) is closer to 100, the shape is closer to a true sphere. The polyamide according to the present embodiment has the sphericity of 80 or greater and has a spherical shape.

In the present embodiment, the sphericity of the polyamide fine particles is preferably 85 or greater, and more preferably 90 or greater. Furthermore, although the sphericity of the polyamide fine particles is the most preferably 100, the polyamide fine particles having a sphericity of 80 or greater can typically achieve smooth sliding properties and sufficient texture. The sphericity of the polyamide fine particles of 80 or greater is preferable from the perspectives of preventing the shape of the polyamide fine particles from being elliptical and achieving suitable smooth sliding properties when the polyamide fine particles are used for cosmetics, coating materials, and toner.

Average Particle Size

The average particle size of the polyamide fine particles is not particularly limited but is preferably from 1 μm to 350 μm, more preferably from 1 μm to 60 μm, even more preferably from 1 μm to 30 μm, and particularly preferably from 1 μm to 10 μm.

Furthermore, preferably, the particle sizes of the polyamide fine particles are uniform. More preferably, the average particle size of the polyamide fine particles is in the range described above and the particle sizes are uniform.

Note that, in the present specification, "uniform particle sizes" means that the proportion of the polyamide fine particles having the particle sizes that are within ±50% of the average particle size relative to the total amount of the polyamide fine particles is 67% or greater, preferably 95% or greater, and most preferably 100%.

The uniform particle sizes of the polyamide fine particles can achieve smooth sliding of the polyamide fine particles on an object to be coated, and thus can achieve uniform coating of the polyamide fine particles on the object to be coated, when the polyamide fine particles are used for, for example, cosmetics, coating materials such as toner or coating.

Weight Average Molecular Weight

The weight average molecular weight (Mw) of the polyamide in the polyamide fine particles is not particularly limited but is preferably from 30,000 to 800,000, more preferably from 30,000 to 600,000, and most preferably from 30,000 to 300,000. In a case where the weight average molecular weight of the polyamide is in this range, mechanical properties, heat resistance, and the like of the polyamide is not impaired during the formation of the polyamide fine particles. Furthermore, the weight average molecular weight of the polyamide may be from 30,000 to 200,000, or from 30,000 to 100,000. In a case where the weight average molecular weight of the polyamide is 30,000 or greater, dispersion of the polyamide fine particles dissolved in hot water into the water side can be effectively suppressed. As a result, the polyamide fine particles in the size of micrometers or greater can be efficiently formed.

Specific Surface Area

For the smooth spherical polyamide fine particles, a smaller specific surface area is preferable, and specifically, the specific surface area is preferably 20 $m^2/g$ or smaller, and particularly preferably 10 $m^2/g$ or smaller. More preferably, the smooth polyamide fine particles have an average particle size from 1 μm to 30 μm and a specific surface area of 20 $m^2/g$ or smaller. The specific surface area can be measured by using the BET method by the use of nitrogen adsorption, or the like.

Advantage of Polyamide Fine Particles

The polyamide fine particles according to the present embodiment are fine particles formed from a particular polyamide as described above and have biodegradability. Therefore, the polyamide fine particles according to the present embodiment may be decomposed in the environment, and thus a low degree of environmental pollution is achieved. Furthermore, the sphericity of the polyamide fine particles according to the present embodiment is 80 or greater, and thus the polyamide fine particles have smooth sliding properties.

Method for Producing Polyamide Fine Particles

The method for producing polyamide fine particles according to the present embodiment is described below.

As the polyamide used in the method for producing the polyamide fine particles according to the present embodiment, a commercially available polyamide can be used. Furthermore, for example, polyamide may be synthesized by the following method.

The polyamide used in the production method according to the present embodiment is not particularly limited as long as the polyamide is a polyamide including a repetition of a structural unit having at least one alkylene group and at least one amide bond, each of the alkylene group having from 1 to 5 carbon atoms as described above. The methods of synthesizing such polyamide are exemplified below.

First synthesizing method of polyamide Examples of the first synthesizing method of the polyamide include a method in which ring-opening polymerization is performed by using an organic compound having a lactam structure as a raw material. Examples of the organic compound having a lactam structure include α-pyrrolidone, ε-caprolactam, and the like. Furthermore, the method of the ring-opening polymerization is not particularly limited, and examples thereof include known methods in the related art, such as bulk polymerization and particle polymerization in a petroleum-based solvent.

More specifically, in this method, for example, the organic compound having a lactam structure described above is subjected to ring-opening by hydrolysis followed by dehydration condensation to synthesize polyamide. At this time, the following procedure may be also selected: that is, a method of anionic ring-opening polymerization, in which an anion species is generated by the reaction of a little amount of base with the organic compound having a lactam structure, and then the anion species causes ring-opening of the organic compound having a lactam structure to elongate the chain.

Second Synthesizing Method of Polyamide

Examples of the second synthesizing method of the polyamide include a method in which amino acid is subjected to self-condensation. Examples of the amino acid include glycine, γ-aminobutanoic acid, and the like.

More specifically, in this method, polyamide is synthesized by subjecting amino acid to dehydration condensation by heating under reduced pressure. At this time, the following procedure is also selected: that is, the Merrifield method, which is publicly known as a method for producing a synthetic peptide, and in which amino acid is bonded to a solid phase, such as beads of polystyrene polymer gel having a diameter of approximately 0.1 mm, and then the amino acid chain is elongated one by one by deprotecting a terminal group after the condensation reaction.

Third synthesizing method of polyamide Examples of the third synthesizing method of the polyamide include a method in which diamine and dicarboxylic acid are condensed. Examples of the diamine include 1,2-ethylenediamine, 1,3-propanediamine, 1,4-butylenediamine, and 1,6-hexamethylenediamine. Furthermore, examples of the dicarboxylic acid include oxalic acid, malonic acid, succinic acid, and adipic acid.

Other Synthesizing Method of Polyamide

In the case of polyamide 3, for example, the polyamide 3 may be synthesized by hydrogen-transfer polymerization of acrylamides.

Furthermore, the synthesizing method of polyamide 4 is, for example, described in Masakazu Taniyama, Takeshi Nagaoka, Toshihiro Takata, Kazunori Sayama. "Alkaline Catalyst Polymerization of α-Pyrrolidone in the Presence of N,N'-Adipyl Dipyrrolidone", The journal of chemical industry (工業化学雑誌), 1962, vol. 65 (3), 419-422, which is listed as Non-patent Document 1. More specifically, the polyamide 4 can be obtained by the following procedure. That is, for a part of α-pyrrolidone, an anion species is generated by the reaction of a small amount of metallic sodium with α-pyrrolidone. N-acylated pyrrolidone is added as an initiator thereto, thereby continuously proceeding the ring-opening reaction of the pyrrolidone to produce the polyamide 4 aggregate.

Method for Producing Polyamide Fine Particle

The method for producing polyamide fine particles according to the present embodiment (hereinafter, also referred to as "the present production method") is described below.

The present production method is a method that uses polyamide having the configuration described above and includes (1) a dissolution step and (2) a precipitation step. These two steps are described in detail below.

(1) Dissolution Step

The dissolution step according to the present embodiment includes dissolving the polyamide having the configuration described above in hot water.

In the dissolution step, the polyamide is preferably dissolved in the condition where the concentration of the polyamide in the hot water is from 0.1 wt. % to 10 wt. %, preferably from 0.1 wt. % to 3 wt. %, and more preferably from 0.1 wt. % to 1 wt. %. By setting the dissolved amount of the polyamide to the range described above, the sphericity of the polyamide fine particles becomes even greater.

In the dissolution step, the temperature of the hot water is preferably from 100° C. to 170° C., more preferably from 100° C. to 150° C., and most preferably from 130° C. to 150° C. The temperature of the hot water in the range described above is preferable from the perspective of solubility of the polyamide to hot water.

In the present embodiment, after the polyamide is added to the water and heated to the predetermined temperature, the polyamide is preferably dissolved while the temperature of the hot water is maintained. Furthermore, in this case, the temperature of the hot water is preferably maintained for 1 minute or longer, more preferably maintained for 30 minutes or longer, and even more preferably maintained for 3 hours or longer, and particularly preferably maintained for 6 hours or longer. Note that, after the polyamide is added to the hot water obtained by heating water to the predetermined temperature in advance, the polyamide may be dissolved while the temperature of the hot water is maintained.

(2) Precipitation Step

In the precipitation step, the mixture of the hot water and the polyamide is cooled after the dissolution step described above. The cooling method is not particularly limited, and examples thereof include a technique that leaves the mixture of the polyamide and the hot water at room temperature (approximately 23° C.), a technique that leaves the mixture of the polyamide and the hot water in cold water, and the like.

In the present embodiment, during the process of cooling the mixture of the hot water and the polyamide, molecules of the polyamide dissolved in the hot water are regularly arranged, thereby forming spherical polyamide fine particles.

In the present embodiment, as necessary, in addition to the steps described above, operation, by which the particle sizes of the polyamide fine particles are regulated by classifying the precipitated polyamide fine particles by a sieve or the like, may be performed.

Use of Polyamide Fine Particle

The polyamide fine particles according to the present embodiment may be used alone. Furthermore, the polyamide fine particles according to the present embodiment may be used as a polyamide fine particle composition containing the polyamide fine particles and another component. Such another component contained in the polyamide fine particle composition may be, for example, biodegradable plastics. Furthermore, examples of such another component include polyethers such as polyethylene glycol, polyalcohols such as polyvinyl alcohol, polyesters such as polylactic acid and polyglycolic acid, and the like.

Regarding the content ratio of the polyamide fine particles to the another component included in the polyamide fine particle composition, for example, the content ratio of polyamide fine particles:other component is preferably from 1:99 to 99:1, more preferably from 2:98 to 98:2, and most preferably from 3:97 to 97:3.

Furthermore, the polyamide fine particle composition may contain 2 or more types of the polyamide fine particles according to the present embodiment. Therefore, for example, the polyamide fine particle composition according to the present embodiment may contain the polyamide fine particles formed from polyamide 2 and polyamide fine particles formed from polyamide 4. Furthermore, in a case where the polyamide fine particle composition according to the present embodiment includes 2 or more different types of polyamide fine particles, the content ratio of these polyamide fine particles is not particularly limited.

The polyamide fine particle composition according to the present embodiment can be used as, for example, compositions for external use, compositions for coating, and compositions for toner, and the like. The use of the polyamide fine particles according to the present embodiment is specifically described below. However, as a matter of course, the use of the polyamide fine particles according to the present embodiment is not limited to the specific examples described below, and it is needless to say that the polyamide fine particles can be suitably used for other purposes.

Composition for External Use

In the present embodiment, "composition for external use" means a composition that is directly and externally used on human body. Examples of the composition for external use include cosmetics, such as foundation, lipstick, and eyeshadow, and the like. Because the composition for external use according to the present embodiment contains the polyamide fine particles, uniform light scattering is achieved by the spherical shape of these polyamide fine particles. Therefore, according to the composition for external use according to the present embodiment, the polyamide fine particles can be suitably used as an additive component to make the light scattering uniform.

In the present embodiment, examples of the component besides the polyamide fine particles included in the composition for external use include components that are included in existing cosmetics and the like.

The content of the polyamide fine particles in the composition for external use is not particularly limited; however, to enhance uniformity of light scattering, the content of the polyamide fine particles in the composition for external use is preferably 3 wt. % or greater, more preferably 5 wt. % or greater, and most preferably 10 wt. % or greater.

Composition for Coating

In the present embodiment, "composition for coating" is a coating material used for buildings, for automobiles, for metal products, for electrical appliances, and the like. Because the composition for coating according to the present embodiment contains the polyamide fine particles, uniform light scattering is achieved by the spherical shape of these polyamide fine particles. Therefore, according to the composition for coating according to the present embodiment, the polyamide fine particles can be suitably used as an additive component to make the light scattering uniform.

In the present embodiment, examples of the component besides the polyamide fine particles included in the composition for coating include components that are included in existing coating materials, such as acrylic resins, urethane resins, thickeners, plasticizers, solvents, and pigments, and the like.

The content of the polyamide fine particles in the composition for coating is not particularly limited; however, to enhance uniformity of light scattering, the content of the polyamide fine particles in the composition for coating is preferably 10 wt. % or greater, more preferably 20 wt. % or greater, and most preferably 30 wt. % or greater.

Composition for Toner

In the present embodiment, "composition for toner" is, for example, toner used in laser printers, copying machines, and the like. The polyamide fine particles according to the present embodiment can be used as, for example, plastic particles in toner. Specifically, for example, the polyamide fine particles can be used as plastic fine particles of toner by imparting electrostatic property to the polyamide fine particles and further allowing color particles, such as pigment, to attach to the polyamide fine particles.

In the present embodiment, examples of the component besides the polyamide fine particles included in the composition for toner include components that are included in existing toner, such as polystyrene and polyester, and the like.

The content of the polyamide fine particles in the composition for toner is not particularly limited; however, to uniformly coat the toner on a target object, such as paper, the content of the polyamide fine particles in the composition for toner is preferably 40 wt. % or greater, more preferably 60 wt. % or greater, and most preferably 90 wt. % or greater.

Method for Producing Composition for External Use, Composition for Coating, and Composition for Toner The composition for external use, the composition for coating, and the composition for toner according to the present embodiment may include one type or two or more types of the polyamide fine particles according to the present embodiment as it is. Furthermore, as described above, the composition for external use, the composition for coating, and the composition for toner according to the present embodiment may include a mixture of the polyamide fine particles according to the present embodiment, a dispersion medium, and an optional component described above. In this case, the dispersion medium is not particularly limited, and examples thereof include water, water-based dispersion mediums such as alcohol-containing aqueous solutions of ethyl alcohol, and glycerin, non-polar oils such as fatty acid esters, and the like. Furthermore, the mixing method is not particularly limited and examples thereof include methods that use an agitator such as a Henschel mixer, a plasto mill, a conical mixer, a kneader, or a ribbon mixer, and the like.

In a case where a configuration having another biodegradable plastic in addition to the polyamide fine particles according to the present embodiment is employed in the composition for external use, the composition for coating, or the composition for toner according to the present embodiment, for example, the melted polyamide and the other biodegradable plastic may be agitated by using a kneader, a ribbon mixer, or the like. Alternatively, a melted/dissolved polyamide and the other biodegradable plastic may be added and mixed in an agitator simultaneously or separately.

SUMMARY

The polyamide fine particle of an embodiment of the present invention includes: a polyamide including a repetition of a structural unit having at least one alkylene group and at least one amide bond, each of the at least one alkylene group having from 1 to 5 carbon atoms, wherein the polyamide fine particle has a sphericity of 80 or greater.

Furthermore, the polyamide fine particles of an embodiment of the present invention preferably have an average particle size from 1 μm to 350 μm.

Furthermore, in the polyamide fine particles of an embodiment of the present invention, the weight average molecular weight is preferably from 30,000 to 800,000.

Furthermore, in the polyamide fine particles of an embodiment of the present invention, the specific surface area is preferably 20 m²/g or less.

Furthermore, in the polyamide fine particles of an embodiment of the present invention, the structural unit is preferably represented by Formula (1) below.

[Chemical Formula 3]

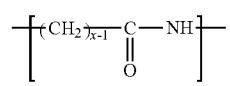

Formula(1)

In the formula, x is an integer from 2 to 5.

Furthermore, in the polyamide fine particles of an embodiment of the present invention, the structural unit is preferably represented by Formula (2) below:

[Chemical Formula 4]

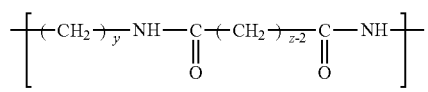

Formula (2)

In the formula, y is an integer from 1 to 5, and z is an integer from 3 to 7.

Furthermore, the method for producing a polyamide fine particle of an embodiment of the present invention is a method having: a dissolution step of dissolving a polyamide in hot water, the polyamide including a repetition of a structural unit having at least one alkylene group and at least one amide bond, each of the at least one alkylene group having from 1 to 5 carbon atoms; and a precipitation step of precipitating a polyamide fine particle having the polyamide by cooling the hot water.

Furthermore, in the method for producing the polyamide fine particles of an embodiment of the present invention, in the dissolution step, the polyamide is preferably dissolved in water or hot water to a concentration of the polyamide from 0.1 wt. % to 10 wt. % in the hot water.

Furthermore, in the method for producing the polyamide fine particles of an embodiment of the present invention, in the dissolution step, the polyamide is preferably dissolved in water or hot water to a concentration of the polyamide from 0.1 wt. % to 3 wt. % in the hot water.

Furthermore, all of the composition for external use, the composition for coating, and the composition for toner of an embodiment of the present invention preferably contain the polyamide fine particles of an embodiment of the present invention.

Embodiments of the present invention are described in further detail below using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present application are hereby incorporated by reference.

EXAMPLES

Synthesis Example

Synthesizing Method of Polyamide 4

The polyamide 4 (hereinafter, also referred to as "PA4") was synthesized in accordance with the synthesizing method described in Masakazu Taniyama, Takeshi Nagaoka, Toshihiro Takata, Kazunori Sayama. "Alkaline Catalyst Polymerization of α-Pyrrolidone in the Presence of N,N'-Adipyl Dipyrrolidone", The journal of chemical industry (工業化学雑誌), 1962, vol. 65 (3), 419-422, which is listed as Non-patent Document 1. More specifically, 1 mol % of metallic sodium (Na) was added to α-pyrrolidone in a sealed flask in hot water bath at 50° C. After Na was dissolved, 0.1 mol % of N,N'-adipyl dipyrrolidone was added as an initiator. Then, the system became immediately cloudy, and soon it became difficult to agitate the system. Ten hours after the termination of the agitation, an aggregate formed in the flask was taken out and pulverized, and then unreacted materials and low molecular weight materials were washed with acetone. Thereafter, the aggregate was dried to obtain a powder PA4.

The weight average molecular weight (Mw) of the obtained PA4 was 96000. The weight average molecular weight was measured by the following procedure, analytical instrument, and conditions.

Measurement Procedure:

In hexafluoroisopropanol (HFIP) in which sodium trifluoroacetate was dissolved at a concentration of 5 mM, 10 mg of PA4 sample obtained as described above was dissolved to make a 10 cm$^3$ solution, and then the solution was filtered by using a membrane filter to obtain a sample solution. In an analytical instrument described below, 10 μL of this sample solution was injected, and the weight average molecular weight of PA4 was measured in the following measurement conditions.

Analytical instrument:
gel permeation chromatograph (GPC) (GPC104, available from Showa Denko K.K.)

Measurement conditions:
A) Shodex 104 system
B) Column: two HFIP 606, available from Showa Denko K.K., in series, 40° C.
C) 5 mM CF3COONa/HFIP, 0.1 mL/min
D) Detector: RI
E) Sample 10 to 11 mg/5 mM CF3COONa/HFIP 10 mL
F) calibration method (PMMA conversion) by PMMA standard substance (150 E4, 65.9 E4, 21.8 E4, 4.96 E4, 2.06 E4, 0.68 E4, 0.2 E4)

Example 1

Preparation of Polyamide 4 Fine Particles

Pure water and the PA4 was added to a pressure-resistant container such that the concentration of the PA4 was 0.1 wt. % relative to the amount of the pure water, and the pressure-resistant container was heated in a thermostatic chamber at 150° C. for 3 hours to dissolve the PA4 in the hot water. After the completion of the heating, the hot water was naturally cooled until the hot water was cooled down to room temperature (23° C.) and further left for one night to obtain a suspension solution in which the PA4 fine particles were dispersed in the pure water.

A drop of the suspension solution obtained by the technique described above was placed on a microscope slide, and a cover glass was placed thereon to obtain an observation sample. Using the observation sample, the dispersion condition of the PA4 fine particles was observed by using an optical microscope (VHX-700F, available from Keyence Corporation; used lens: VH-Z100R) in the condition at room temperature (23° C.) and the magnification of ×300. The observation result is shown in FIG. 1. FIG. 1 is an optical photomicrograph of polyamide fine particles obtained by setting the concentration of the PA4 to 0.1 wt. %. As is clear from FIG. 1, the PA4 fine particles were dispersed without being aggregated in the pure water.

From the optical photomicrograph shown in FIG. 1, 30 particles of the PA4 fine particles were randomly chosen. For each of the PA4 fine particles, the minor axis and the major axis were measured, and the sphericity of the PA4 fine particles was determined by the following equation. The result is shown in Table 1.

(Equation 2)

$$\text{Sphericity} = \left\{ \left( \sum_{i=1}^{n} (\text{minor axis/major axis}) \right) / 30 \right\} \times 100$$

Furthermore, from the optical photomicrograph shown in FIG. 1, 50 particles of the PA4 fine particles were randomly chosen, and the particle sizes thereof were measured. The average value of these particle sizes was used as the average particle size of the PA4 fine particles. The result is shown in Table 1.

Example 2

Figure 2:
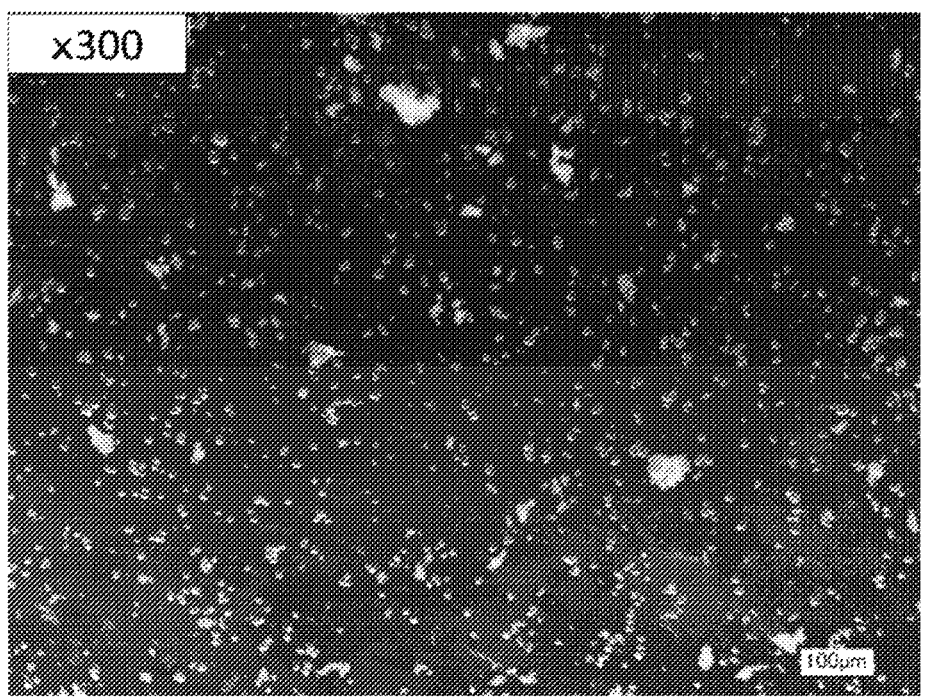
FIG. 2 is an optical photomicrograph of polyamide fine particles obtained by setting the concentration of the polyamide 4 to 1.0 wt. % in Example 2 of an embodiment of the present invention.

A suspension solution was obtained in the same manner as in Example 1 except for adding the PA4 such that the concentration of the PA4 was 1 wt. %. For the obtained suspension solution, observation was performed by using the optical microscope in the same manner as in Example 1. The observation result is shown in FIG. 2. FIG. 2 is an optical photomicrograph of polyamide fine particles obtained by setting the concentration of the PA4 to 1.0 wt. %. As is clear from FIG. 2, the PA4 fine particles were dispersed without being aggregated in the pure water. Furthermore, from the optical photomicrograph shown in FIG. 2, the sphericity and the average particle size of the PA4 fine particles were determined in the same manner as in Example 1. These results are shown in Table 1.

Example 3

Figure 3:
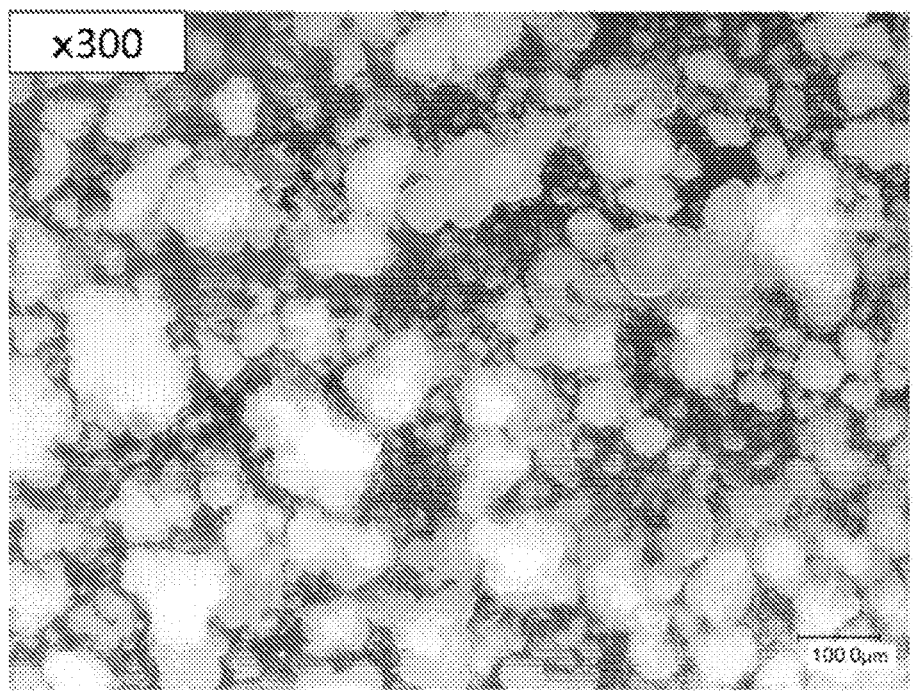
FIG. 3 is an optical photomicrograph of polyamide fine particles obtained by setting the concentration of the polyamide 4 to 10 wt. % in Example 3 of an embodiment of the present invention.

A suspension solution was obtained in the same manner as in Example 1 except for adding the PA4 such that the concentration of the PA4 was 10 wt. %. For the obtained suspension solution, observation was performed by using the optical microscope in the same manner as in Example 1. The observation result is shown in FIG. 3. FIG. 3 is an optical photomicrograph of polyamide fine particles obtained by setting the concentration of the PA4 to 10 wt. %. As is clear from FIG. 3, the PA4 fine particles were dispersed without being aggregated in the pure water. Furthermore, from the optical photomicrograph shown in FIG. 3, the sphericity and the average particle size of the PA4 fine particles were determined in the same manner as in Example 1. These results are shown in Table 1.

Comparative Example 1

Figure 4:
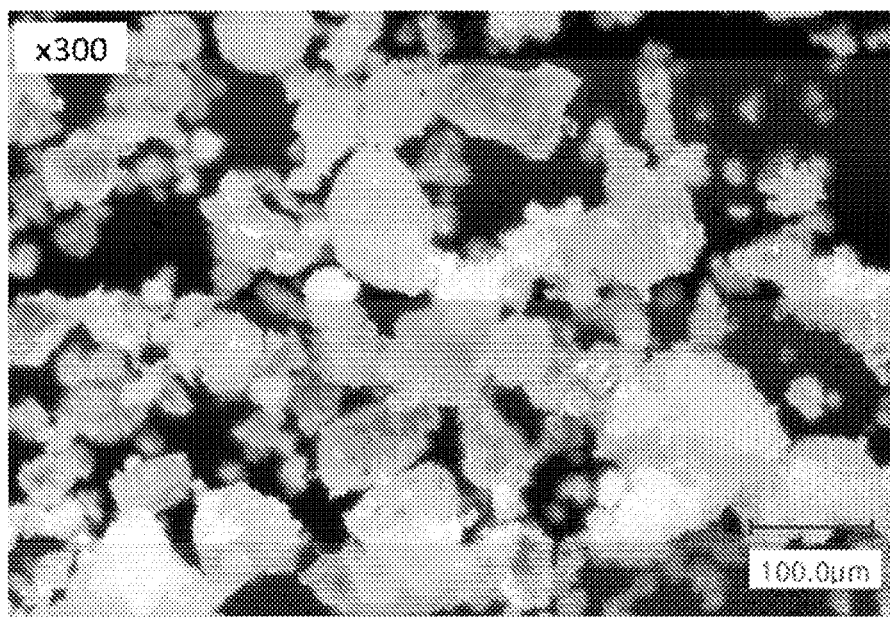
FIG. 4 is an optical photomicrograph of fine particles obtained by pulverizing the polyamide 4 in Comparative Example 1 of an embodiment of the present invention.

The PA4 obtained in the synthetic example was pulverized by using a mortar to obtain fine particles. For the obtained fine particles, observation was performed by using the optical microscope in the same manner as in Example 1. The observation result is shown in FIG. 4. FIG. 4 is an optical photomicrograph of fine particles obtained by pulverizing the polyamide 4. Furthermore, from the optical photomicrograph shown in FIG. 4, the sphericity and the average particle size of the fine particles were determined in the same manner as in Example 1. These results are shown in Table 1.

Example 4

Pure water and the PA4, having the weight average molecular weight of approximately 80,000, was added to a 1 L pressure-resistant container such that the concentration of the PA4 was 1 wt. % relative to the amount of the pure water, and the 1 L pressure-resistant container was heated to allow the inner temperature to be 150° C. to dissolve the PA4 in the hot water. After the heating was completed and then the temperature of the hot water was maintained for 30 minutes, the hot water was cooled down to room temperature (23° C.) to obtain a suspension solution in which the PA4 fine particles are dispersed in the pure water. Furthermore, the obtained suspension solution was filtered by using a filter paper, and the substance remained on the filter paper was vacuum dried at 80° C. for 8 hours to obtain polyamide 4 fine particles. By using a 1 L pressure-resistant container, sufficient amount of the sample to perform specific surface area measurement can be obtained.

SEM Observation

Figure 5:
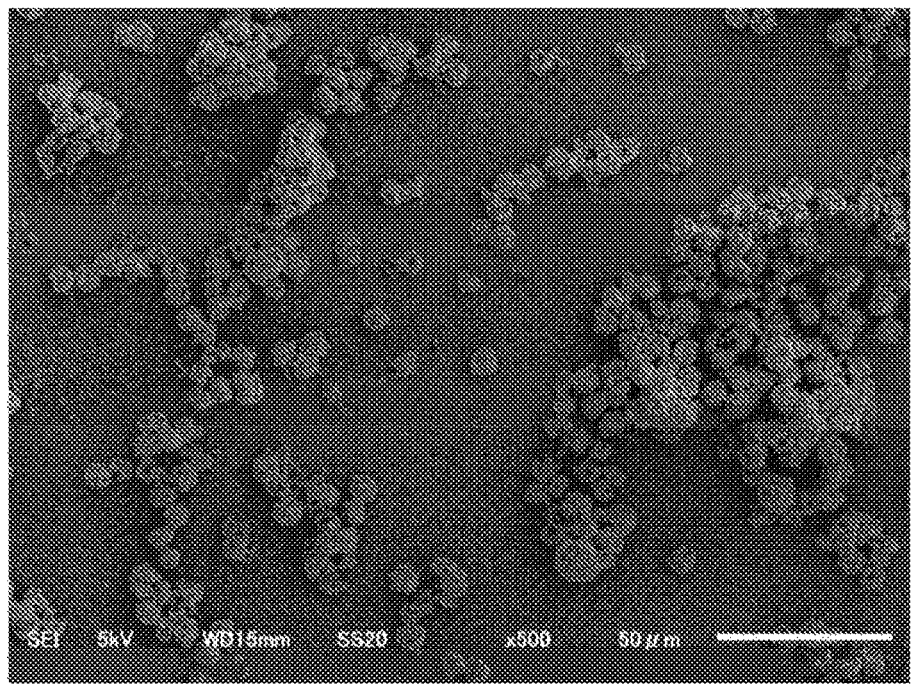
FIG. 5 is an SEM image of the polyamide fine particles obtained in Example 4 of an embodiment of the present invention.

When the polyamide 4 fine particles obtained by the technique described above was observed by using a scanning electron microscope (NeoScope JCM-5000, available from JEOL Ltd.), the polyamide 4 fine particles were spherical particles shown in FIG. 5. Furthermore, the sphericity and the average particle size were determined in the same manner as in Example 1 except for using the SEM image in place of the optical photomicrograph. The results are shown in Table 2.

Measurement of Specific Surface Area

The polyamide 4 fine particles were further dried at 120° C. for 10 minutes. The specific surface area measurement instrument (MONOSORB, available from Quantachrome Instruments) was used to measure the specific surface area of the dried polyamide 4 fine particles. The result is shown in Table 2.

Example 5

Figure 6:
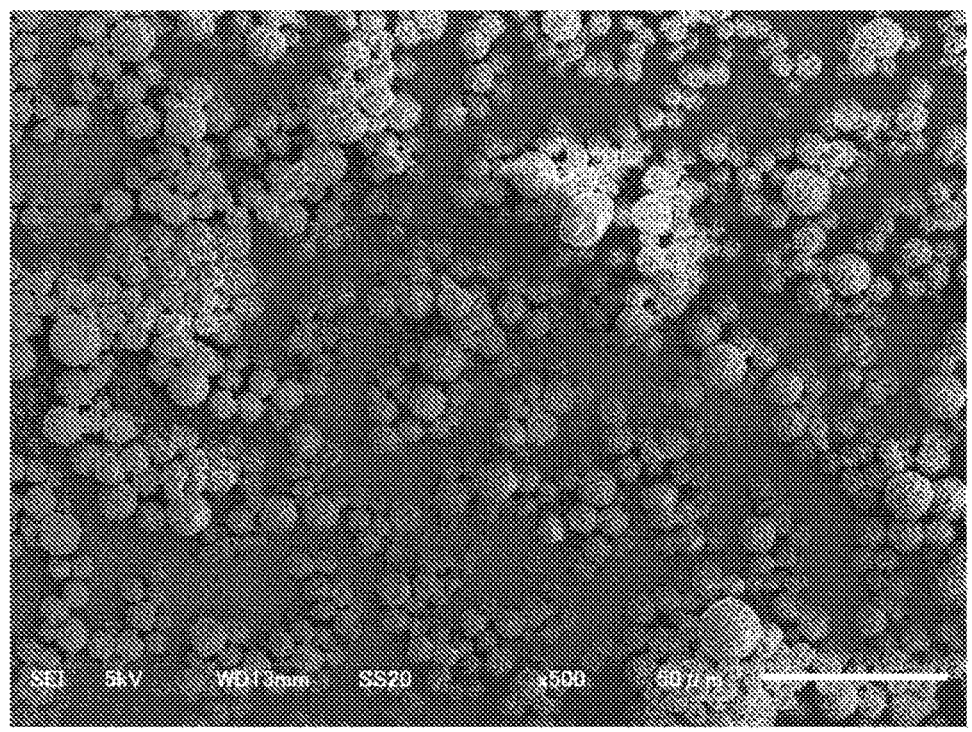
FIG. 6 is an SEM image of the polyamide fine particles obtained in Example 5 of an embodiment of the present invention.

Polyamide 4 fine particles were obtained in the same manner as in Example 4 except that the weight average molecular weight of the PA4 that was added to the 1 L pressure-resistant container was approximately 210,000. When the obtained polyamide 4 fine particles were subjected to SEM observation in the same manner as in Example 4, the polyamide 4 fine particles were spherical particles shown in FIG. 6. Furthermore, the sphericity and the average particle size were determined in the same manner as in Example 4 by using the SEM image. The results are shown in Table 2. Furthermore, the specific surface area of the obtained polyamide 4 fine particles was measured in the same manner as in Example 4. The result is shown in Table 2.

Example 6

Figure 7:
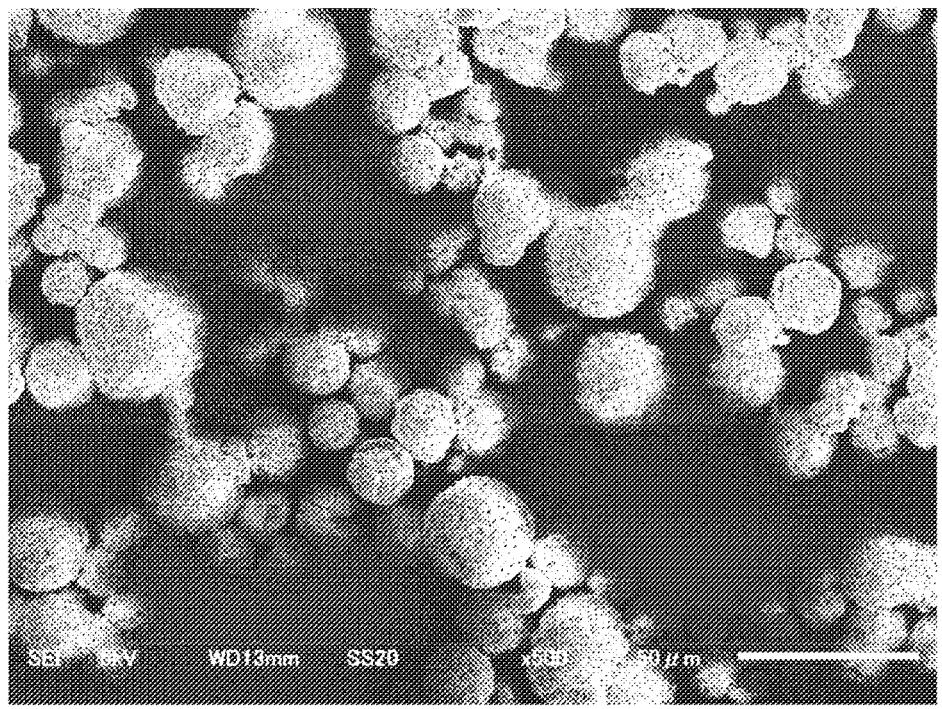
FIG. 7 is an SEM image of the polyamide fine particles obtained in Example 6 of an embodiment of the present invention.

Polyamide 4 fine particles were obtained in the same manner as in Example 4 except that the concentration of the PA4 was 5 wt. %. When the obtained polyamide 4 fine particles were subjected to SEM observation in the same manner as in Example 4, the polyamide 4 fine particles were spherical particles shown in FIG. 7. Furthermore, the sphericity and the average particle size were determined in the same manner as in Example 4 by using the SEM image. The results are shown in Table 2.

Furthermore, the specific surface area of the obtained polyamide 4 fine particles was measured in the same manner as in Example 4. The result is shown in Table 2.

Example 7

Figure 8:
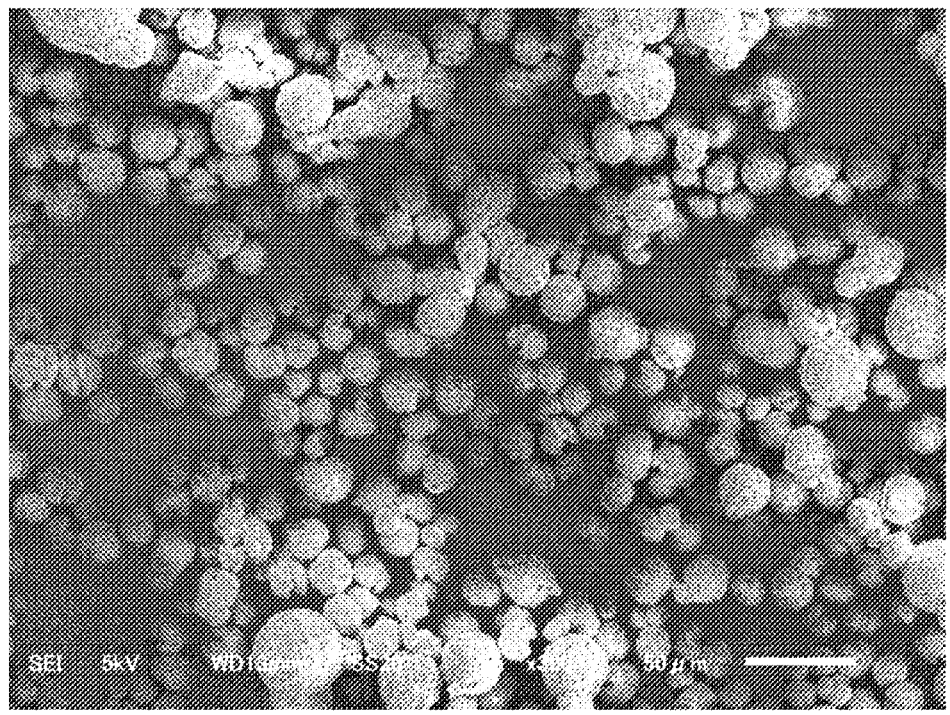
FIG. 8 is an SEM image of the polyamide fine particles obtained in Example 7 of an embodiment of the present invention.

Polyamide 4 fine particles were obtained in the same manner as in Example 4 except that the weight average molecular weight of the PA4 that was added to the pressure-resistant container was approximately 210,000 and the concentration of the PA4 was 5 wt. %. When the obtained polyamide 4 fine particles were subjected to SEM observation in the same manner as in Example 4, the polyamide 4 fine particles were spherical particles shown in FIG. 8. Furthermore, the sphericity and the average particle size were determined in the same manner as in Example 4 by using the SEM image. The results are shown in Table 2.

Furthermore, the specific surface area of the obtained polyamide 4 fine particles was measured in the same manner as in Example 4. The result is shown in Table 2.

TABLE 1

|  | PA4 concentration (wt. %) | Heating temperature (° C.) | Heating time (h) | Sphericity | Average particle size (μm) |
|---|---|---|---|---|---|
| Example 1 | 0.1 | 150 | 3 | 95 | 13 |
| Example 2 | 1 | 150 | 3 | 94 | 14 |
| Example 3 | 10 | 150 | 3 | 87 | 57 |
| Comparative Example 1 | — | — | — | 61 | 71 |

TABLE 2

|  | PA4 concentration (wt. %) | Particle shape | Sphericity | Average particle size (μm) | Specific surface area (m$^2$/g) |
|---|---|---|---|---|---|
| Example 4 | 1 | Spherical | 92 | 8.5 | 12.7 |
| Example 5 | 1 | Spherical | 94 | 8.8 | 7.0 |
| Example 6 | 5 | Spherical | 95 | 20.0 | 9.5 |
| Example 7 | 5 | Spherical | 94 | 18.2 | 5.8 |

INDUSTRIAL APPLICABILITY

The fine particles formed from the polyamide of an embodiment of the present invention can be suitably used as fine particles contained in products, such as cosmetics, personal care products, and coating materials.

The invention claimed is:

1. A polyamide fine particle comprising a polyamide including a repetition of a structural unit having at least one alkylene group and at least one amide bond, each of the at least one alkylene group having from 1 to 4 carbon atoms, wherein the polyamide fine particle has an average particle size, based on microscopy, of 1 µm to 30 µm and has a sphericity of 85 or greater, wherein a specific surface area is 20 m²/g or less.

2. The polyamide fine particle according to claim 1, wherein the average particle size is from 1 µm to 10 µm.

3. The polyamide fine particle according to claim 1, wherein a weight average molecular weight is from 30,000 to 800,000.

4. The polyamide fine particle according to claim 1, wherein the structural unit is represented by Formula (1):

[Chemical Formula 1]

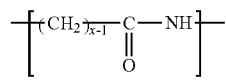

Formula(1)

wherein, x is an integer from 2 to 5.

5. The polyamide fine particle according to claim 1, wherein the structural unit is represented by Formula (2) below:

[Chemical Formula 2]

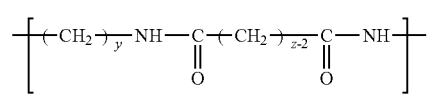

Formula (2)

wherein y is an integer from 1 to 5, and z is an integer from 3 to 7.

* * * * *